US007673338B1

(12) United States Patent
Osburn, III et al.

(10) Patent No.: US 7,673,338 B1
(45) Date of Patent: *Mar. 2, 2010

(54) INTELLIGENT ELECTRONIC CRYPTOGRAPHIC MODULE

(75) Inventors: Douglas C. Osburn, III, Houston, TX (US); John D. Cannoy, Long Beach, MS (US)

(73) Assignee: DJ Inventions, LLC, Houston, TX (US)

( * ) Notice: Subject to any disclaimer, the term of this patent is extended or adjusted under 35 U.S.C. 154(b) by 321 days.

This patent is subject to a terminal disclaimer.

(21) Appl. No.: 11/829,053

(22) Filed: Jul. 26, 2007

(51) Int. Cl.
*G06F 9/00* (2006.01)
*G06F 15/16* (2006.01)
*G06F 17/00* (2006.01)

(52) U.S. Cl. ............ 726/12; 726/1; 726/4; 380/255; 380/282; 713/153

(58) Field of Classification Search ........... 380/282, 380/255; 726/1, 4, 5, 12; 713/153
See application file for complete search history.

(56) References Cited

U.S. PATENT DOCUMENTS

| | | | | |
|---|---|---|---|---|
| 5,568,402 A * | 10/1996 | Gray et al. | ......... | 709/224 |
| 5,719,771 A | 2/1998 | Buck et al. | | |
| 5,926,745 A * | 7/1999 | Threadgill et al. | ......... | 455/12.1 |
| 6,058,307 A * | 5/2000 | Garner | ......... | 455/428 |
| 6,243,580 B1 * | 6/2001 | Garner | ......... | 455/428 |
| 6,628,992 B2 * | 9/2003 | Osburn, III | ......... | 700/9 |
| 6,658,349 B2 | 12/2003 | Cline | | |
| 6,751,562 B1 * | 6/2004 | Blackett et al. | ......... | 702/61 |
| 6,788,980 B1 * | 9/2004 | Johnson | ......... | 700/1 |
| 6,792,337 B2 * | 9/2004 | Blackett et al. | ......... | 700/295 |
| 6,944,555 B2 * | 9/2005 | Blackett et al. | ......... | 702/62 |
| 6,950,851 B2 * | 9/2005 | Osburn, III | ......... | 709/203 |
| 6,961,753 B1 * | 11/2005 | Osburn, III | ......... | 709/203 |
| 6,963,817 B2 * | 11/2005 | Ito et al. | ......... | 702/138 |
| 6,985,831 B2 * | 1/2006 | Ito et al. | ......... | 702/188 |
| 6,990,527 B2 * | 1/2006 | Spicer et al. | ......... | 709/229 |
| 7,007,093 B2 * | 2/2006 | Spicer et al. | ......... | 709/229 |
| 7,020,532 B2 * | 3/2006 | Johnson et al. | ......... | 700/89 |
| 7,047,274 B2 * | 5/2006 | Thomas et al. | ......... | 709/200 |
| 7,066,010 B2 * | 6/2006 | Bryant et al. | ......... | 73/40.5 R |
| 7,085,824 B2 * | 8/2006 | Forth et al. | ......... | 709/221 |
| 7,127,328 B2 * | 10/2006 | Ransom | ......... | 700/286 |
| 7,167,081 B2 * | 1/2007 | Strumpf et al. | ......... | 340/310.13 |
| 7,188,003 B2 * | 3/2007 | Ransom et al. | ......... | 700/286 |
| 7,216,043 B2 * | 5/2007 | Ransom et al. | ......... | 702/62 |
| 7,225,248 B1 * | 5/2007 | Osburn, III | ......... | 709/223 |
| 7,228,129 B1 * | 6/2007 | Ward et al. | ......... | 455/423 |
| 7,248,978 B2 * | 7/2007 | Ransom | ......... | 702/62 |

(Continued)

*Primary Examiner*—David García Cervetti
(74) *Attorney, Agent, or Firm*—Buskop Law Group, PC; Wendy Buskop (57) ABSTRACT

An intelligent electronic cryptographic module comprising a processor in communication with data storage, a cryptography chip for encrypting and decrypting messages and responses, at least one server-side port for receiving and transmitting encrypted and non-encrypted messages and responses between the intelligent electronic cryptographic module and an enterprise server, and at least one non-encrypted port for receiving and transmitting decrypted and non-encrypted messages and responses between the intelligent electronic cryptographic module and at least one intelligent electronic device. The data storage comprises computer instructions for instructing the processor to select a protocol module and telemetry method, authenticate the enterprise server and intelligent electronic cryptographic module, encrypt and decrypt messages and responses using the cryptography chip, and transmit and receive messages and responses.

18 Claims, 3 Drawing Sheets

U.S. PATENT DOCUMENTS

| | | | |
|---|---|---|---|
| 7,263,459 B2 * | 8/2007 | Ito et al. | 702/138 |
| 7,286,914 B2 | 10/2007 | Cerchione et al. | |
| 7,350,070 B2 * | 3/2008 | Smathers et al. | 713/150 |
| 7,415,368 B2 * | 8/2008 | Gilbert et al. | 702/61 |
| 7,447,760 B2 * | 11/2008 | Forth et al. | 709/223 |
| 7,453,267 B2 * | 11/2008 | Westbrock et al. | 324/522 |
| 7,467,018 B1 * | 12/2008 | Callaghan | 700/1 |
| 7,532,640 B2 * | 5/2009 | Kelly et al. | 370/466 |
| 7,587,481 B1 * | 9/2009 | Osburn, III | 709/223 |
| 2002/0147503 A1 * | 10/2002 | Osburn, III | 700/9 |
| 2002/0147808 A1 * | 10/2002 | Osburn, III | 709/224 |
| 2002/0158776 A1 | 10/2002 | Lash et al. | |
| 2003/0105608 A1 * | 6/2003 | Hart | 702/122 |
| 2003/0154056 A1 * | 8/2003 | Ito et al. | 702/188 |
| 2003/0204756 A1 * | 10/2003 | Ransom et al. | 713/300 |
| 2003/0212512 A1 * | 11/2003 | Hart | 702/57 |
| 2003/0220752 A1 * | 11/2003 | Hart | 702/61 |
| 2004/0059469 A1 * | 3/2004 | Hart | 700/291 |
| 2004/0098218 A1 * | 5/2004 | Ito et al. | 702/138 |
| 2004/0138786 A1 * | 7/2004 | Blackett et al. | 700/295 |
| 2004/0138834 A1 * | 7/2004 | Blackett et al. | 702/62 |
| 2004/0193329 A1 * | 9/2004 | Ransom et al. | 700/286 |
| 2004/0217900 A1 | 11/2004 | Martin et al. | |
| 2004/0264402 A9 * | 12/2004 | Whitmore et al. | 370/328 |
| 2005/0005093 A1 * | 1/2005 | Bartels et al. | 713/150 |
| 2005/0039040 A1 * | 2/2005 | Ransom et al. | 713/200 |
| 2005/0122250 A1 | 6/2005 | Taylor | |
| 2005/0131583 A1 * | 6/2005 | Ransom | 700/295 |
| 2005/0138120 A1 | 6/2005 | Gundersen et al. | |
| 2005/0138432 A1 * | 6/2005 | Ransom et al. | 713/201 |
| 2005/0144437 A1 * | 6/2005 | Ransom et al. | 713/151 |
| 2005/0185787 A1 * | 8/2005 | Kow | 379/355.04 |
| 2005/0226419 A1 * | 10/2005 | Smathers et al. | 380/259 |
| 2006/0023676 A1 * | 2/2006 | Whitmore et al. | 370/338 |
| 2006/0052985 A1 * | 3/2006 | Ito et al. | 702/188 |
| 2006/0067209 A1 * | 3/2006 | Sheehan et al. | 370/216 |
| 2006/0191457 A1 | 8/2006 | Murphy | |
| 2006/0203804 A1 * | 9/2006 | Whitmore et al. | 370/352 |
| 2006/0238932 A1 * | 10/2006 | Westbrock et al. | 361/42 |
| 2006/0270383 A1 * | 11/2006 | Yergens et al. | 455/404.1 |
| 2007/0078839 A1 * | 4/2007 | Teodoro et al. | 707/4 |
| 2007/0199061 A1 * | 8/2007 | Byres et al. | 726/11 |
| 2007/0202859 A1 * | 8/2007 | Ward | 455/414.1 |
| 2008/0065449 A1 * | 3/2008 | Blagg et al. | 705/8 |
| 2008/0101251 A1 * | 5/2008 | Casebolt et al. | 370/252 |
| 2009/0002150 A1 * | 1/2009 | Zilberstein et al. | 340/531 |
| 2009/0106551 A1 * | 4/2009 | Boren et al. | 713/158 |
| 2009/0132299 A1 * | 5/2009 | Patton | 705/4 |
| 2009/0212226 A1 | 8/2009 | Britton, JR. et al. | |

* cited by examiner

INTELLIGENT ELECTRONIC CRYPTOGRAPHIC MODULE

FIELD

The present embodiments relate to an intelligent electronic cryptographic module for communication between at least one intelligent electronic device and an enterprise server.

BACKGROUND

A need exists for an intelligent electronic cryptographic module able to selectively encrypt, decrypt, and securely transmit messages, commands, data, and responses between an enterprise server and one or more intelligent electronic devices.

A further need exists for an intelligent electronic cryptographic module able to perform mixed-mode transmission, selectively encrypting specified messages or messages from a specified source, while omitting encryption of one or more other messages.

A need exists for an intelligent electronic cryptographic module that can be configured to perform different mixed-mode transmissions on-line, without interrupting the normal functions of the intelligent electronic cryptographic module, the enterprise server, or any of the intelligent electronic devices in communication with the intelligent electronic cryptographic module.

A need also exists for an intelligent electronic cryptographic module that is able to reconfigure one or more intelligent electronic devices or be reconfigured online, without interrupting the normal functions of the intelligent electronic cryptographic module, the enterprise server, or any of the other intelligent electronic devices in communication with the module.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present intelligent electronic cryptographic module provides enhanced security more efficiently than conventional encryption means by permitting online, real time reconfiguration of the module and attached intelligent electronic devices. Through this on-line reconfiguration, the intelligent electronic cryptographic module, any of the attached intelligent electronic devices, or a central enterprise server can be reconfigured without interrupting service to any of the intelligent electronic devices, or interrupting the functions of the intelligent electronic devices or the intelligent electronic cryptographic module, thereby maintaining continuity of service and saving costs and hindrances associated with deactivating modules and units.

The intelligent electronic cryptographic module can provide secure communication between an enterprise server and various kinds of intelligent electronic devices, including remote terminal units, programmable logic controllers, and other similar intelligent electronic devices.

Even "Legacy Remote Terminal Units" which lack the hardware or software to be reconfigured on-line can be selectively reconfigured without affecting the function of any intelligent electronic devices, the enterprise server, or the intelligent electronic cryptographic module. Additionally, data, messages, and responses from legacy remote terminal units can be selectively encrypted and decrypted using the online configurable intelligent electronic cryptographic module.

The intelligent electronic cryptographic module can include software enabling the intelligent electronic cryptographic module to both function as an online configurable remote terminal unit for performing a variety of processes, and to function as an online configurable intelligent electronic cryptographic module, selectively encrypting and decrypting messages and responses between an online configurable enterprise server and one or more intelligent electronic devices.

The present intelligent electronic cryptographic module further allows for efficient security by permitting pass-through transmission of messages, responses, commands, and data, independent of the associated gateway protocols. The module can provide mixed-mode transmission, selectively encrypting only specified messages or messages from a specified source, saving time, costs, and bandwidth, while permitting other data to pass through the cryptographic module. The specifications relating to the mixed-mode transmission can be reconfigured on-line, in real time, without interrupting the functions of the intelligent electronic cryptographic module.

The pass-through capabilities of the present intelligent electronic cryptographic module allow the connectivity and security between an enterprise server, the intelligent electronic cryptographic module, and one or more intelligent electronic devices to be efficiently and effectively tested prior to encrypting transmissions, and at any time during service.

The present intelligent electronic cryptographic module provides enhanced security through use of authentication means, such as digital certificates and keys, and tamper proof encryption through use of a cryptography chip. The embodied cryptography chip can be built into the module or separately attached using a removable data storage media. The cryptography chip is compatible with the Windows CE Operating System, Windows XP, Windows 2003, and other similar operating systems, and can be utilized through a standard cryptographic application programming interface (CAPI™).

The authentication means provided through use of the cryptography chip within the intelligent electronic cryptographic module provide greater security than conventional means, which typically do not include authentication of system components. The authentication of the enterprise server, the intelligent electronic cryptographic module, and one or more intelligent electronic devices can be selectively performed as frequently as needed to maintain security, or as infrequently as needed to conserve costs and bandwidth.

The present embodiments relate to an intelligent electronic cryptographic module for communication between an enterprise server and at least one intelligent electronic device. An intelligent electronic device can be a remote terminal unit (RTU), such as an Autosol RTU 4000, a Bristol Babcock 3330 RTU, an Emerson ROC 809, or similar remote terminal units. An intelligent electronic device can also be a programmable logic controller (PLC) or other similar intelligent electronic devices.

The intelligent electronic cryptographic module can include a secure enclosure, which can be any kind of durable housing, including secure, tamper-resistant and weather-resistant enclosures.

One or more power supplies can be disposed within the secure enclosure for supplying power to each of the components of the intelligent electronic cryptographic module. It is contemplated that the power supplies can include direct current sources, alternating current sources, rechargeable power sources, replaceable power sources, renewable power sources, or combinations thereof.

The intelligent electronic cryptographic module has a first processor disposed within the secure enclosure. The first processor can be in communication with one or more data storage media and a cryptographic application programming interface (CAPI™). The data storage can include removable memory, non-removable memory, flash memory, or combinations thereof. The data storage can include a first authentication module, however it is contemplated that the first authentication module can instead be included in memory within a first cryptography chip disposed within the secure enclosure, in communication with the first processor.

The first processor is adapted to authenticate the enterprise server, any of the remote terminal units, or combinations thereof. The first processor is also adapted to provide encrypted and non-encrypted communication with the enterprise server and non-encrypted communication with one or more of the remote terminal units.

A first cryptography chip, such as a Spyrus Rosetta, or a Spyrus Lynks, made by Spyrus of San Jose, Calif., is disposed within the secure enclosure, in communication with the first processor, for decrypting messages from the enterprise server, encrypting responses from one or more of the intelligent electronic devices, or combinations thereof.

In an embodiment, the first cryptography chip can be disposed within a first removable data storage device, which can be in communication with the processor through a port, such as a universal serial bus port. This embodiment can advantageously allow the cryptography chip to be utilized in aftermarket applications.

It is contemplated that the first cryptography chip can include cryptographic tamper resistant memory, which can contain one or more encryption and decryption algorithms, one or more keys, a random number generator, at least one certificate for digital signatures, an authentication module, and combinations thereof.

The intelligent electronic cryptographic module can include at least one server-side port, such as such as an interface for a radio, a modem, an Ethernet, a satellite, or similar interfaces, for receiving encrypted messages, non-encrypted messages, or combinations thereof from the enterprise server. The one or more server-side ports can also be used to transmit encrypted and non-encrypted responses from the intelligent electronic devices to the enterprise server via the intelligent electronic cryptographic module.

Both the encrypted and non-encrypted messages can include reconfiguration commands for reconfiguring one or more of the intelligent electronic devices.

The intelligent electronic cryptographic module also has at least one non-encrypted port, such as a RS232, KB9, or RS45 terminal, for transmitting one or more decrypted messages or encrypted messages to one or more of the intelligent electronic devices, and receiving non-encrypted responses from the intelligent electronic devices.

It is contemplated that the one or more server-side ports, non-encrypted ports, or combinations thereof can be an interface adapted for engaging a serial port, a cellular modem, a standard modem, a wireline modem, a satellite network, a Transfer Connection Protocol/Internet Protocol, an Ethernet, a radio network, a fiber-optic network, or combinations thereof.

The server-side ports, the non-encrypted ports, or combinations thereof can further be adapted to engage at least two industry standard protocols simultaneously. Contemplated industry standard protocols can include a MODBUS, a DNP3.0, a BSAP™, a Megaco/H.248 protocol, simple message transfer protocol (SMTP), a short message service (SMS) protocol, a multimedia message service (MMS) protocol, an enhanced message service (EMS) protocol, a media gateway control protocol (MGCP), a SIP protocol, a H.323 protocol, an ISDN protocol, a PSTN protocol, and combinations thereof.

The data storage media of the present intelligent electronic cryptographic module can include computer instructions for instructing the first processor to perform as a soft remote terminal unit, as described in U.S. Pat. No. 6,628,992.

It is contemplated that when the intelligent electronic cryptographic module performs as a remote terminal unit, in addition to performing intelligent encryption and decryption functions, the use of additional intelligent electronic devices in communication with the intelligent electronic cryptographic module can be omitted, and the intelligent electronic cryptographic module can both function as a cryptographic module and as a remote terminal unit simultaneously.

When the intelligent electronic cryptographic module functions as a remote terminal unit, the module advantageously becomes both an intelligent cryptographic module and an online configurable remote terminal unit. This is a noteworthy advantage over conventional "Legacy Remote Terminal Units," which typically lack hardware or software to permit online configurability or encrypted transmissions. Use of the intelligent electronic cryptographic module as a remote terminal unit also provides enhanced security by eliminating the clear-text link between the intelligent electronic cryptographic module and a Legacy Remote Terminal Unit.

It is further contemplated, however, that any number of additional remote terminal units or other intelligent electronic devices can be in communication with the intelligent electronic cryptographic module, independent of the online configurability of any of the intelligent electronic devices, and independent of whether the intelligent electronic cryptographic module is also functioning as a soft remote terminal unit.

The data storage also includes computer instructions for instructing the first processor to select at least one protocol module, such as BSAP, MODBUS, ROC, DNP 3.0, or other similar protocol modules, for communication with one or more of the intelligent electronic devices, the enterprise server, or combinations thereof. The computer instructions also instruct the first processor to select at least one appropriate telemetry method, such as a modem, a radio, an Ethernet, a satellite, or other similar telemetry methods, for transmitting and receiving messages using the one or more selected protocol modules. The use of a telemetry method can be facilitated through use of one or more connection modules.

The computer instructions further instruct the processor to authenticate, at least once, that the intelligent electronic cryptographic module is authorized to transmit to the enterprise server, and to authenticate, at least once, that the enterprise server is authorized to transmit to the intelligent electronic cryptographic module. This provides an additional level of security over conventional means, which typically lack authentication. The authentication of the enterprise server and the intelligent electronic cryptographic module can be performed as frequently as necessary to ensure security, or as infrequently as necessary to conserve costs and bandwidth.

The data storage also includes computer instructions for instructing the first processor to decrypt encrypted messages transmitted from the enterprise server using the first cryptography chip, and to transmit decrypted messages to one or more of the intelligent electronic devices. The computer instructions also instruct the first processor to receive non-encrypted responses from intelligent electronic devices, encrypt the responses using the cryptography chip, and transmit the encrypted responses to the enterprise server.

In an embodiment, the data storage can include computer instructions for instructing the processor to embed a digital signature in the enterprise server, embed a digital signature in the intelligent electronic cryptographic module, and validate the digital signatures prior to encrypting or transmitting responses, and decrypting or transmitting messages.

It is also contemplated that the data storage can include computer instructions for instructing the processor to receive at least one public and exchange key from the enterprise server. The public exchange key can be derived by the server processor or the server cryptography chip. The computer instructions further instruct the processor to derive at least one session key, and encrypt the session key using the public exchange key. The encrypted session key can then be transmitted to the enterprise server. It is contemplated that the session key can then be used to encrypt messages and responses transmitted between the enterprise server and the intelligent electronic cryptographic module.

It is further contemplated that the computer instructions could instruct the first processor to derive at least one public and at least one private exchange key and transmit the public exchange key to the enterprise server. The computer instructions could also instruct the first processor to receive an encrypted session key, derived by the enterprise server and encrypted by the enterprise server using the public key. The encrypted session key can then be decrypted using the private key and used to encrypt messages and responses transmitted between the enterprise server and the intelligent electronic cryptographic module.

In a contemplated embodiment, the intelligent electronic cryptographic module can include a telemetry interface, such an interface for a modem, a radio, an Ethernet, a satellite, or other similar telemetry methods, in communication with the first processor and the enterprise server.

In an embodiment, the intelligent electronic cryptographic module can also include a means for wirelessly transmitting messages and responses between the intelligent electronic devices and the enterprise server. Wireless transmission means can include spreadspectrum radios, multipoint radios, satellite transmission means, cellular transmission means, and other similar means.

It is contemplated that the enterprise server can include a server processor in communication with server data storage, a server telemetry interface, such as a modem, a radio, a satellite, or an Ethernet interface, and a server port for receiving a removable data storage device having a second cryptography chip. The server data storage can include a server authentication module, a server protocol module, such as a BSAP, a MODBUS, or similar protocol modules, and a server connection module, such as a serial module, a dial-up module, or a TCP/IP module. It is contemplated that the server authentication module can also be resident in memory within the second cryptography chip.

The server data storage can include computer instructions for instructing the server processor to configure the enterprise server, the intelligent electronic cryptographic module, one or more of the intelligent electronic devices, or combinations thereof.

In an embodiment, the server data storage can also include a configuration software, such as Autosol RTU Maintenance Environment (ARME) made by Automated Solutions of Houston, Tex., for enabling the online reconfiguration of one or more intelligent electronic devices in communication with the enterprise server.

It is contemplated that the first cryptography chip in the intelligent electronic cryptographic module, the second cryptography chip in the enterprise server, or combinations thereof can be selectively activated, to perform encryption and decryption functions, and deactivated, to allow messages to pass through without encryption or decryption, on-line, without interruption of service to any of the intelligent electronic devices.

The data storage of the intelligent electronic cryptographic module can also include a log for storing information, such as configuration changes, communication statistics, and data from one or more intelligent electronic devices, from the intelligent electronic cryptographic module.

Figure 1:
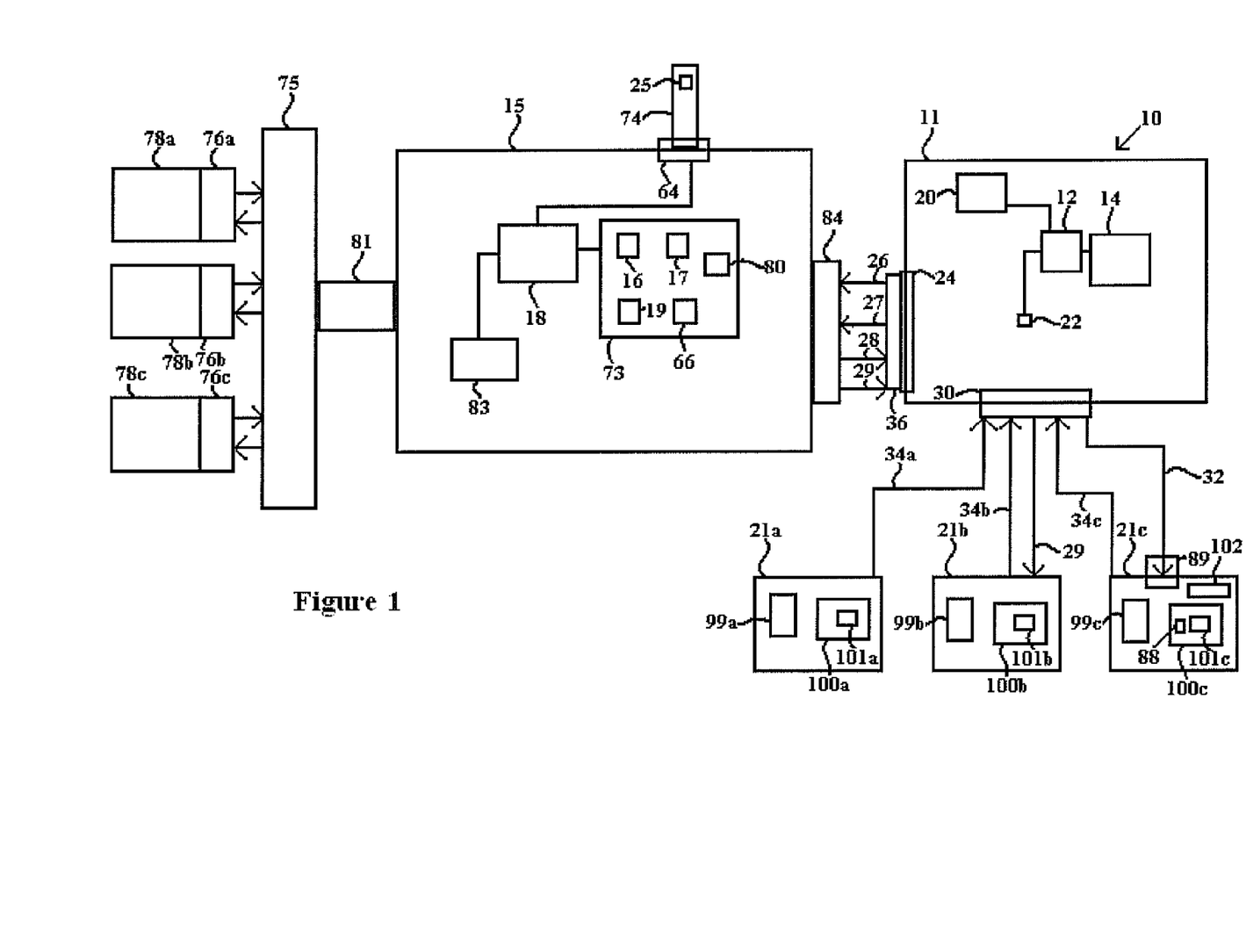
FIG. 1 depicts a diagram of a system incorporating an embodiment of the present intelligent electronic cryptographic module.

Referring now to FIG. 1, a diagram depicting a system incorporating the present intelligent electronic cryptographic module is shown.

Intelligent electronic cryptographic module 10 is shown having secure enclosure 11. Intelligent electronic cryptographic module 10 is depicted having a first processor 12 in communication with a first data storage 14. First processor 12 is also in communication with a first cryptography chip 22.

A power supply 20, is also depicted within intelligent electronic cryptographic module 10 in communication with first processor 12 for supplying power to first processor 12 and other components of intelligent electronic cryptographic module 10.

Intelligent electronic cryptographic module 10 is shown having a server-side port 24 for receiving encrypted message 28 and non-encrypted message 29, and for transmitting encrypted response 26 and non-encrypted response 27 to an enterprise server 15 via telemetry interface 36 and server telemetry interface 84. While only one server-side port 24 is depicted, intelligent electronic cryptographic module 10 can have any number of server-side ports, including separate ports for encrypted communication, non-encrypted communication, and mixed-mode communication.

Intelligent electronic cryptographic module 10 is also depicted having a non-encrypted port 30 for receiving first non-encrypted response 34*a* from first remote terminal unit 21*a*, second non-encrypted response 34*b* from second remote terminal unit 21*b*, and third non-encrypted response 34*c*, from third remote terminal unit 21*c*. While intelligent electronic cryptographic module 10 is depicted in communication with three remote terminal units, it is contemplated that intelligent electronic cryptographic module 10 can be in communication with any type and any number of intelligent electronic devices.

It is contemplated that first processor 12 can use first cryptography chip 22 to selectively encrypt first non-encrypted response 34*a*, second non-encrypted response 34*b*, and third non-encrypted response 34*c* prior to transmitting each response to enterprise server 15. It is contemplated that non-encrypted responses can also be transmitted to enterprise server 15, such as when a low priority remote terminal unit does not require secure encryption.

Non-encrypted port 30 is also shown transmitting non-encrypted message 29 to second remote terminal unit 21b and a decrypted message 32 to a third remote terminal unit 21c.

First remote terminal unit 21a is shown having first RTU processor 99a and first RTU data storage 100a. First RTU data storage has computer instructions 101a for instructing first RTU processor 99a to transmit data to enterprise server 15 via intelligent electronic cryptographic module 10.

Second remote terminal unit 21b is shown having second RTU processor 99b and second RTU data storage 100b. Second RTU data storage has computer instructions 101b for instructing second RTU processor 99b to transmit data to enterprise server 15 via intelligent electronic cryptographic module 10.

Third remote terminal unit 21c is shown having third RTU processor 99c and third RTU data storage 100c. Third RTU data storage has computer instructions 101c for instructing third RTU processor 99c to transmit data to enterprise server 15 via intelligent electronic cryptographic module 10.

Third remote terminal unit 21c is depicted having an analog-to-digital converter 102 and computer instructions 88 in third RTU data storage 100c for instructing third RTU processor 99c to selectively store and transmit digital representations measured by third remote terminal unit 21c. Third remote terminal unit 21c also has a bidirectional port 89 for transmitting the digital representations to enterprise server 15 via intelligent electronic cryptographic module 10 and receiving commands and responses from enterprise server 15.

Enterprise server 15 is shown having a server processor 18 in communication with server data storage 73. Server data storage 73 is shown having a server authentication module 16, a server protocol module 17, and a server connection module 19. Server data storage 73 also includes computer instructions 66 for reconfiguring first remote terminal unit 21a, second remote terminal unit 21b, or third remote terminal unit 21c. Server data storage 73 is further depicted having server configuration database 80, such as an Oracle or Microsoft Access database, for restoring online configurations of the enterprise server when the server is reset. Enterprise server 15 is also shown having server power supply 83 in communication with server processor 18.

Enterprise server 15 is also having a server removable data storage 74 in communication with sever processor 18 via a server port 64, such as a universal serial bus port. Server removable data storage 74 has a second cryptography chip 25, which is contemplated to be substantially similar to first cryptography chip 22.

A first client device 78a having first client interface 76a, a second client device 78b, having second client interface 76b, and a third client device 78c having third client interface 76c are shown in communication with enterprise server 15 via configurable server interface 75, such as OLE for Process Control (OPC), and server application protocol interface 81. First client device 78a, second client device 78b, and third client device 78c can be used to transmit reconfiguration commands to enterprise server 15 or any of first remote terminal unit 21a, second remote terminal unit 21b, or third remote terminal unit 21c, and to receive data and responses.

First client device 78a, second client device 78b, and third client device 78c can be any type of client device, including computers, cellular telephones, personal digital assistants, enterprise data servers, and other similar devices.

Figure 2:
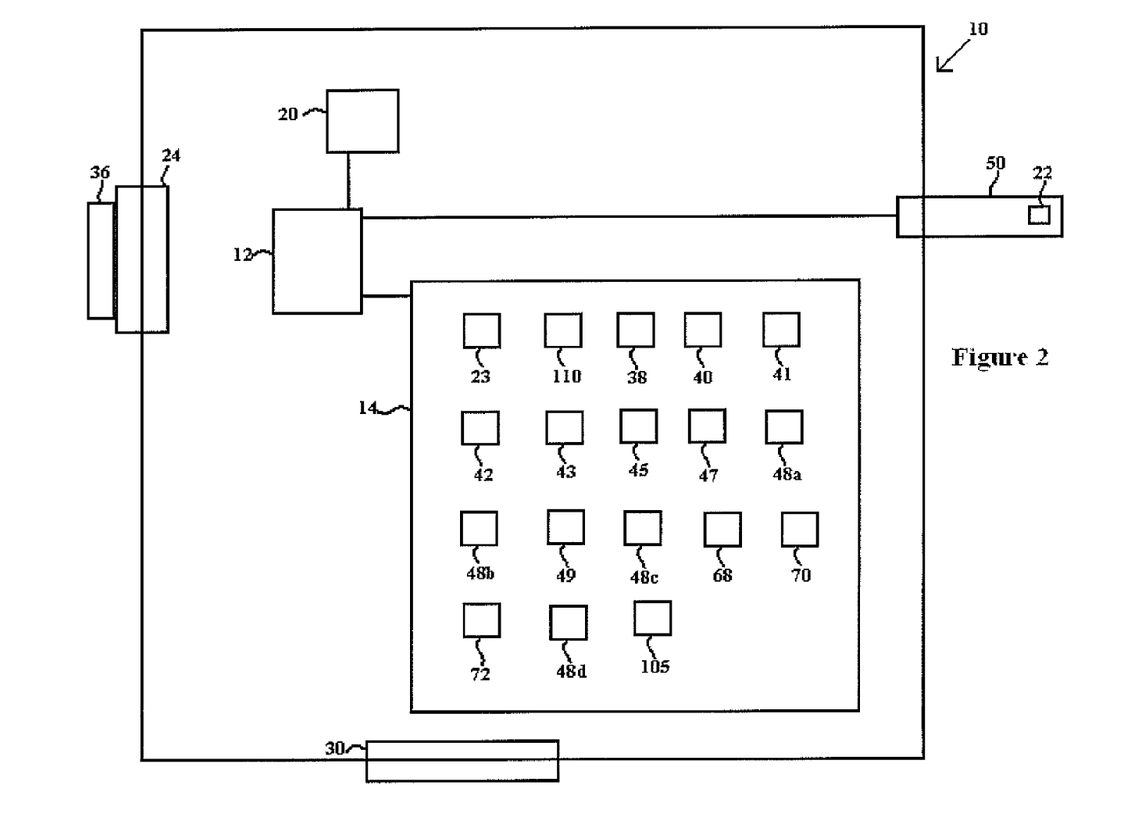
FIG. 2 depicts a diagram of an alternative embodiment of the present intelligent electronic cryptographic module.

Referring now to FIG. 2, a diagram of an alternative embodiment of intelligent electronic cryptographic module 10 is depicted.

Intelligent electronic cryptographic module 10 is shown having first processor 12 in communication with first data storage 14 and power supply 20.

Removable data storage device 50 having first cryptography chip 22 is shown in communication with intelligent electronic cryptographic module 10, such as via a universal serial bus port, such that first processor 12 can use first cryptography chip 22 to encrypt and decrypt messages and responses. It is contemplated that use of first cryptography chip 22 within removable data storage device 50 can allow modules that lack built-in cryptography capability to incorporate use of first cryptography chip 22.

Intelligent electronic cryptographic module 10 is also shown having server-side port 24, telemetry interface 36, and non-encrypted port 30.

First data storage 14 is depicted having authentication module 23 and cryptographic application programming interface (CAPI™) 110. First data storage 14 is also depicted having computer instructions 38 for instructing first processor 12 to perform as a soft remote terminal unit.

First data storage 14 additionally has computer instructions 40 for instructing first processor 12 to select a protocol module. Protocol module 41 is depicted within first data storage 14. While a single protocol module 41 is depicted, any number of selectable protocol modules can be included within first data storage 14.

Computer instructions 42 for instructing first processor 12 to select an appropriate telemetry method using protocol module 41 are also included in first data storage 14.

First data storage 14 also includes computer instructions 43 for instructing first processor 12 to authenticate that the enterprise server is authorized to transmit to one or more remote terminal units, and computer instructions 45 for instructing first processor 12 to authenticate that one or more remote terminal units are authorized to transmit to the enterprise server.

First data storage 14 has computer instructions 47 for instructing first processor 12 to decrypt encrypted messages from the enterprise server using first cryptography chip 22, and computer instructions 49 for instructing first processor 12 to encrypt non-encrypted responses from one or more remote terminal units using first cryptography chip 22.

First data storage 14 further has computer instructions 48a for instructing first processor 12 to receive encrypted messages from the enterprise server and computer instructions 48b for instructing first processor 12 to transmit decrypted messages to one or more remote terminal units.

First data storage 14 additionally has computer instructions 48c for instructing first processor 12 to receive non-encrypted responses from remote terminal units and computer instructions 48d for instructing first processor 12 to transmit encrypted responses to the enterprise server.

Computer instructions 68 for instructing first processor 12 to embed a digital signature in the enterprise server are also depicted within first data storage 14. Computer instructions 70 for instructing first processor 12 to embed a digital signature in one or more remote terminal units are further depicted within first data storage 14. Additionally, computer instructions 72 for instructing first processor 12 to validate the digital signatures of the enterprise server and remote terminal units are also depicted.

First data storage 14 is also shown including a log 105 for storing information from intelligent electronic cryptographic module 10, relating to events in the intelligent electronic cryptographic module 10, such as configuration changes.

Figure 3:
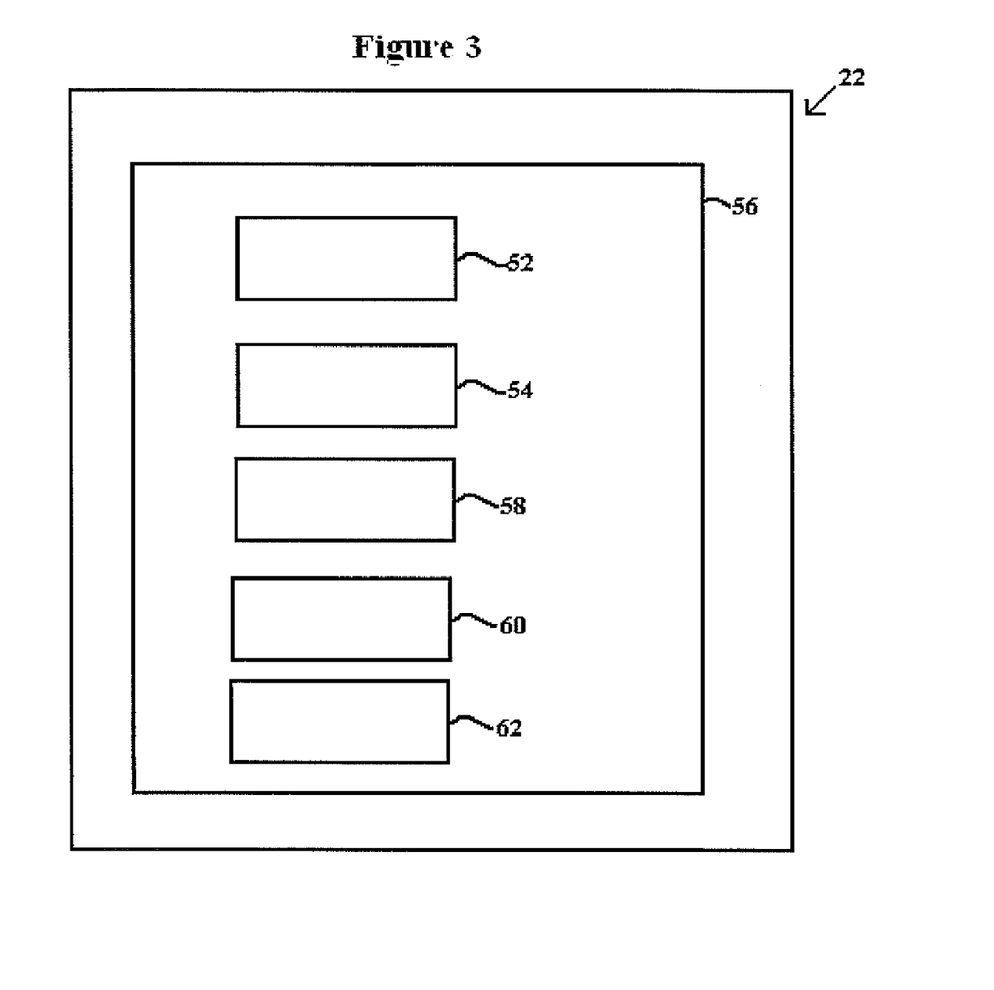
FIG. 3 depicts a diagram of an embodiment of a cryptography chip within the present intelligent electronic cryptographic module.

Referring now to FIG. 3, a diagram depicting an embodiment of first cryptography chip 22 is shown. It is contemplated that second cryptography chip 25 can be identical or substantially similar to first cryptography chip 22, as depicted in FIG. 3.

First cryptography chip 22 is shown having cryptographic tamper resistant memory 56, which is contemplated to be effective against both electronic and physical attempts to penetrate encryption algorithms.

Cryptographic tamper resistant memory 56 is depicted containing encryption algorithms 52, decryption algorithms 54, stored keys 58, a random number generator 60, and certificates 62 for establishing digital signatures.

First cryptography chip 22 can include any number of encryption or decryption algorithms, keys, random number generators, or digital signatures, limited only by the capacity of cryptographic tamper resistant memory 56.

While these embodiments have been described with emphasis on the embodiments, it should be understood that within the scope of the appended claims, the embodiments might be practiced other than as specifically described herein.

What is claimed is:

1. An intelligent electronic cryptographic module for communication between at least one intelligent electronic device and an enterprise server, wherein the intelligent electronic cryptographic module comprises:
    a secure enclosure;
    at least one power supply;
    a first processor disposed within the secure enclosure, in communication with at least one data storage comprising a cryptographic application programming interface, wherein the first processor is adapted to authenticate the enterprise server, the intelligent electronic cryptographic module, at least one intelligent electronic device, or combinations thereof, provide encrypted and non-encrypted communication with the enterprise server, and provide non-encrypted communication with the at least one intelligent electronic device;
    a first cryptography chip disposed within the secure enclosure for decrypting messages from the enterprise server and encrypting responses from the at least one intelligent electronic device, wherein the first cryptography chip is in communication with the first processor;
    at least one server-side port for receiving a member of the group consisting of: at least one encrypted message, at least one non-encrypted message, or combinations thereof from the enterprise server and for transmitting a member of the group consisting of: at least one encrypted response, at least one non-encrypted response or combinations thereof to the enterprise server;
    at least one non-encrypted port for transmitting at least one decrypted message, the at least one non-encrypted message or combinations thereof from the intelligent electronic cryptographic module to the at least one intelligent electronic device and receiving the at least one non-encrypted response from the at least one intelligent electronic device;
    wherein the at least one data storage comprises computer instructions for instructing the first processor to:
        perform as a soft remote terminal unit;
        select at least one protocol module for communication with the at least one intelligent electronic device, the enterprise server, or combinations thereof, forming at least one selected protocol module;
        select at least one appropriate telemetry method for transmitting and
        receiving messages using the at least one selected protocol module;
        at least once authenticate that the enterprise server is authorized to transmit to the intelligent electronic cryptographic module, forming an authenticated enterprise server;
        at least once authenticate that the intelligent electronic cryptographic module is authorized to transmit to the enterprise server;
        receive the at least one encrypted message from the authenticated enterprise server;
        decrypt the at least one encrypted message transmitted from the authenticated enterprise server using the first cryptography chip, forming the at least one decrypted message;
        transmit the at least one decrypted message to the at least one intelligent electronic device;
        receive at least one non-encrypted response from the at least one intelligent electronic device;
        encrypt the at least one non-encrypted response from the at least one intelligent electronic device using the first cryptography chip, forming the at least one encrypted response; and
        transmit the at least one encrypted response to the enterprise server.

2. The intelligent electronic cryptographic module of claim 1, wherein the first cryptography chip is disposed within a first removable data storage device.

3. The intelligent electronic cryptographic module of claim 1, wherein the enterprise server comprises a server processor, a server telemetry interface, a server port for receiving a second removable data storage device comprising a second cryptography chip, wherein the server processor is in communication with a server data storage comprising a server protocol module and a server connection module.

4. The intelligent electronic cryptographic module of claim 1, wherein the at least one encrypted message, the at least one non-encrypted message, or combinations thereof comprise at least one reconfiguration command for configuring the at least one intelligent electronic device, the intelligent electronic cryptographic module, the enterprise server, or combinations thereof.

5. The intelligent electronic cryptographic module of claim 1, further comprising a telemetry interface in communication with the first processor and the enterprise server.

6. The intelligent electronic cryptographic module of claim 1, wherein the at least one data storage comprises removable memory, non-removable memory, flash memory, or combinations thereof.

7. The intelligent electronic cryptographic module of claim 1, wherein the at least one power supply comprises a direct current source, an alternating current source, at least one rechargeable power source, at least one replaceable power source, at least one renewable power source, or combinations thereof.

8. The intelligent electronic cryptographic module of claim 1, wherein the first cryptography chip comprises at least one encryption algorithm, at least one decryption algorithm, cryptographic tamper resistant memory, at least one key resident in the cryptographic tamper resistant memory, a random number generator, at least one certificate for digital signatures, an authentication module, or combinations thereof.

9. The intelligent electronic cryptographic module of claim 3, wherein the enterprise server further comprises computer instructions for instructing the server processor to online configure the at least one intelligent electronic device.

10. The intelligent electronic cryptographic module of claim 1, wherein the at least one data storage further comprises computer instructions for instructing the first processor to embed a first digital signature in the enterprise server, embed a second digital signature in the intelligent electronic cryptographic module, and transmit and validate the first digital signature, the second digital signature, or combinations thereof prior to encrypting non-encrypted responses, decrypting encrypted messages, transmitting encrypted responses, or transmitting decrypted messages.

11. The intelligent electronic cryptographic module of claim 1, further comprising means for wirelessly transmitting messages and responses between the at least one intelligent electronic device and the enterprise server.

12. The intelligent electronic cryptographic module of claim 1, wherein the at least one server-side port, the at least one non-encrypted port, or combinations thereof is an interface adapted for engaging a serial port, a cellular modem, a standard modem, a wireline modem, a satellite network, a Transfer Connection Protocol/Internet Protocol, an Ethernet, a radio network, a fiber-optic network, or combinations thereof.

13. The intelligent electronic cryptographic module of claim 1, wherein the at least one server-side port, the at least one non-encrypted port, or combinations thereof are adapted to engage at least two industry standard protocols simultaneously.

14. The intelligent electronic cryptographic module of claim 13, wherein the at least two industry standard protocols are selected from the group consisting of: a MODBUS, a DNP3.0, a BSAP™, a Megaco/H.248 protocol, simple message transfer protocol (SMTP), a short message service (SMS) protocol, a multimedia message service (MMS) protocol, an enhanced message service (EMS) protocol, a media gateway control protocol (MGCP), a SIP protocol, a H.323 protocol, an ISDN protocol, a PSTN protocol, and combinations thereof.

15. The intelligent electronic cryptographic module of claim 1, wherein encrypting and decrypting functions of the first cryptography chip can be selectively activated and deactivated.

16. The intelligent electronic cryptographic module of claim 1, wherein the intelligent electronic cryptographic module further comprises computer instructions for instructing the first processor to:
receive at least one public exchange key from the enterprise server;
derive at least one session key;
encrypt the at least one session key using the at least one public key, forming at least one encrypted session key;
transmit the at least one encrypted session key to the online configurable enterprise server; and
wherein the at least one session key is used to encrypt messages and responses transmitted between the enterprise server and the intelligent electronic cryptographic module.

17. The intelligent electronic cryptographic module of claim 1, wherein the intelligent electronic cryptographic module further comprises computer instructions for instructing the first processor to:
derive at least one public exchange key and at least one private exchange key;
transmit the at least one public exchange key to the enterprise server;
receive the at least one encrypted session key from the enterprise server;
decrypt the at least one session key using the at least one private key;
wherein the at least one session key is used to encrypt messages and responses transmitted between the enterprise server and the intelligent electronic cryptographic module.

18. An intelligent electronic cryptographic module for communication with an enterprise server, wherein the intelligent electronic cryptographic module comprises:
a secure enclosure;
at least one power supply;
a first processor disposed within the secure enclosure, in communication with at least one data storage comprising a cryptographic application programming interface, wherein the first processor is adapted to authenticate the enterprise server and provide encrypted and non-encrypted communication with the enterprise server;
a first cryptography chip disposed within the secure enclosure for decrypting messages from the enterprise server and encrypting responses from the intelligent electronic cryptographic module, wherein the first cryptography chip is in communication with the first processor;
at least one port for receiving a member of the group consisting of: at least one encrypted message, at least one non-encrypted message, or combinations thereof from the enterprise server and for transmitting a member of the group consisting of: at least one encrypted response, at least one non-encrypted response or combinations thereof to the enterprise server;
wherein the at least one data storage comprises computer instructions for instructing the first processor to:
perform as a soft remote terminal unit;
select at least one protocol module for communication with the enterprise server, forming at least one selected protocol module;
select at least one appropriate telemetry method for transmitting and receiving messages using the at least one selected protocol module;
at least once authenticate that the enterprise server is authorized to transmit to the intelligent electronic cryptographic module, forming an authenticated enterprise server;
at least once authenticate that the intelligent electronic cryptographic module is authorized to transmit to the enterprise server;
receive the at least one encrypted message from the authenticated enterprise server;
decrypt the at least one encrypted message transmitted from the authenticated enterprise server using the first cryptography chip, forming the at least one decrypted message;
encrypt the at least one non-encrypted response from the intelligent electronic cryptographic module unit using the first cryptography chip, forming the at least one encrypted response; and
transmit the at least one encrypted response to the enterprise server.

* * * * *